May 13, 1969     J. F. BLUMRICH ET AL     3,443,773
DOCKING STRUCTURE FOR SPACECRAFT
Filed July 13, 1967     Sheet 1 of 2
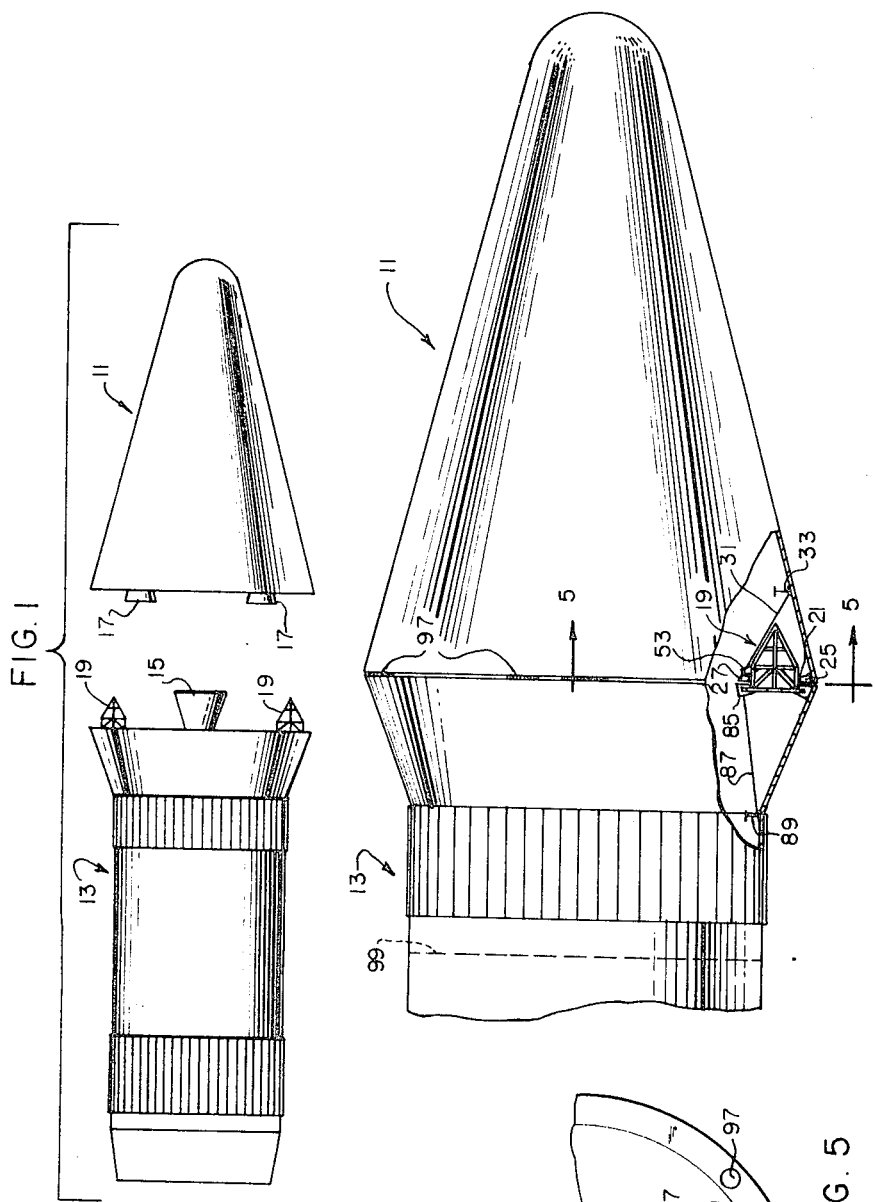
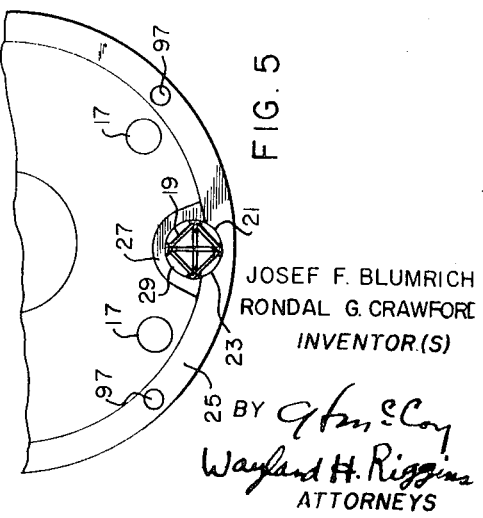
JOSEF F. BLUMRICH
RONDAL G. CRAWFORD
INVENTOR.(S)
BY *G. F. McCoy*
*Wayland H. Riggins*
ATTORNEYS May 13, 1969   J. F. BLUMRICH ET AL   3,443,773
DOCKING STRUCTURE FOR SPACECRAFT
Filed July 13, 1967                              Sheet 2 of 2

JOSEF F. BLUMRICH
RONDAL G. CRAWFORD
*INVENTOR.(S)*

BY
*ATTORNEYS*

United States Patent Office 3,443,773
Patented May 13, 1969

3,443,773
DOCKING STRUCTURE FOR SPACECRAFT
Josef Franz Blumrich, 2721 Briarwood Drive SE., and Rondal G. Crawford, 1804 Inspiration Lane S., both of Huntsville, Ala. 35801
Filed July 13, 1967, Ser. No. 653,277
Int. Cl. B64g 1/00
U.S. Cl. 244—1                 10 Claims

ABSTRACT OF THE DISCLOSURE

A docking structure for a pair of spacecraft with the docking end of the first spacecraft having a circular opening that receives a projecting incoming element on the docking end of the second spacecraft. At the free end of the incoming element is the apex of a pyramid structure that diverges toward the second spacecraft and merges into a prismatic portion that is relatively shorter than the pyramid structure and is connected to the second spacecraft. The side of the circular opening in the first spacecraft initially contacts one or more corners of the pyramid portion of the incoming projecting element and subsequently guides the incoming element into the docked position wherein the side of the circular opening engages the corners of the prismatic portion of the incoming element. Energy absorbing crushable material pads are provided between the mating surfaces of the first and second spacecraft and automatic latching means are provided for locking the projecting elements within the circular openings.

---

The invention described herein was made by employees of the United States Government and may be manufactured and used by or for the Government for governmental purposes without the payment of any royalties thereon or therefor.

Background of the invention

This invention relates generally to docking structures and more particularly to means for docking spacecraft while such craft are in flight.

Rendezvousing and docking of space vehicles constitutes an essential and critical operation in future space exploration since, in making trips to the moon and planets, it is required that crew members, fuel and other supplies be transferred from one vehicle to the other during flight. As is always the case with flight hardware, it is desirable that the docking structure be of the least possible weight while affording maximum reliability. A principal disadvantage of existing docking structures is the relatively large amount of weight and length or height required for their construction, particularly when applied to large-diameter space vehicles.

Docking structures which have been used or proposed heretofore typically comprise a female cone or conical frustrum on one spacecraft that receives a corresponding male cone or conical frustrum on the other spacecraft. In this kind of arrangement the apex or tip of the cone or the rim of the conical frustrum initially contacts the inside of the female conical receptacle and subsequently slides into final position thus requiring that the receptacle cone be designed to accept concentrated loads at any point on its surface. This necessitates that the receptacle cone be relatively heavy and also that the supporting frame members that transfer the loads from the receptacle to the primary structure of the space vehicle be relatively heavy. Moreover, the length or height of previous docking structures contributes unduly to the length of the space vehicles in which they are incorporated.

Thus, a reduction in length of the docking structure would also reduce the overall length of the space vehicles.

Summary of the invention

The invention comprises cooperating structures on first and second space vehicles to be docked in flight. A circular opening having a relatively narrow sidewall is provided at the docking end of the first vehicle while the second vehicle is equipped with a projecting docking element with the free end thereof constituting the apex of a pyramid. The pyramid structure diverges from the apex toward the body of the second vehicle and then merges into a prismatic portion that is normally shorter than the pyramid structure and is firmly connected to the second vehicle. During the docking operation the apex of the pyramid portion of the docking element enters the circular opening in the first vehicle and one or more of the corners of the pyramid portion initially contacts the sidewall of the circular opening. Subsequently the projecting docking element is guided into and centered within the circular opening while the sidewall of the circular opening moves over the pyramid portion and ultimately engages all corners of the prismatic portion the sides of which are of a width substantially equal to a chord of the circle defined by the circular opening. Automatic latching means are provided for locking the projecting docking element within the circular opening, and energy absorbing means are provided between the mating surfaces of the first and second vehicles to absorb the docking energy.

Accordingly, it is a general object of the present invention to provide an improved docking structure particularly from the standpoint of weight saving.

Another object of the invention is to provide a docking structure that automatically guides the docking vehicles into proper alignment and couples the vehicles together with the use of structure reduced substantially both in bulk and weight.

Another object of the invention is to provide a docking structure that can be applied to large diameter space vehicles for successfully docking such vehicles while still using docking structure of relatively small dimension and weight.

These and other objects and advantages of the invention will become apparent upon reference to the following specification, attendant claims and drawings.

Brief description of the drawing

FIGURE 1 is a view showing two space vehicles oriented for docking;

FIGURE 2 is a view, partially broken away, showing the docking ends of the space vehicles of FIGURE 1 subsequent to the docking maneuver;

FIGURE 5 is a cross sectional view taken along line 5—5 of FIGURE 2.

Description of the preferred embodiment

Figure 3:
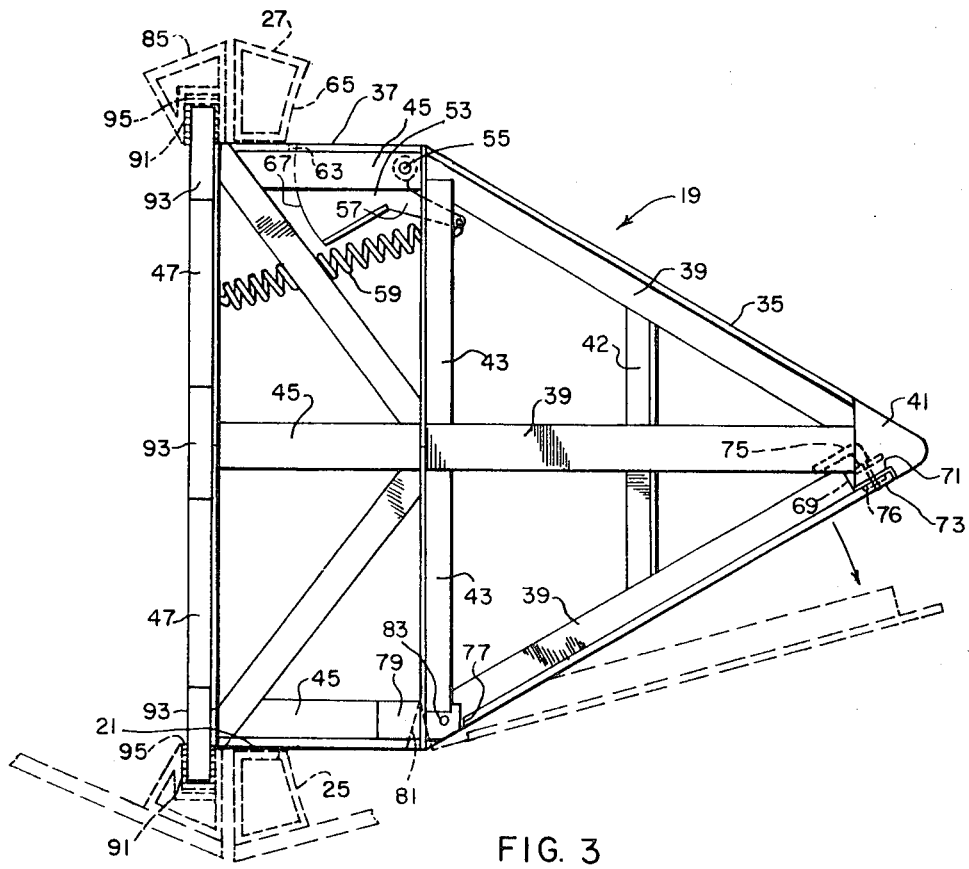
FIGURE 3 is an enlarged elevational view of a projecting docking element on one vehicle that enters a circular opening in the opposite vehicle during the docking operation.

Referring to FIGURE 1 therein is shown space vehicles 11 and 13 oriented for docking while in flight so that operations such as transfer of fuel, supplies or crew members may be accomplished from one vehicle to the other, the vehicle 13 being provided with a rocket engine 15 and the vehicle 11 being provided with a plurality of rocket engines 17. The vehicle 13 is equipped with two diametrically opposed docking elements 19 that are about to project into circular openings 21 (FIGURES 2 and 5) at the docking end of vehicle 11.

As shown in FIGURES 2 and 5, each circular opening 21 in the vehicle 11 is formed by a circular recess 23 in an end structural ring 25 of the vehicle 11 and a U-shaped member 27 that is joined to the structural ring 25 and has a circular inside surface 29 that cooperates with the recess 23 in forming the circular opening 21. It is noted that the framing structure that defines the opening 21 is relatively short dimension in cross-section thickness and width and constitutes essentially a light weight ring. To support the member 27 very firmly, a strut 31 extends between the member 27 and an annular frame member 33 of the vehicle 11, it being understood that several such struts could be provided if deemed necessary.

Figure 4:
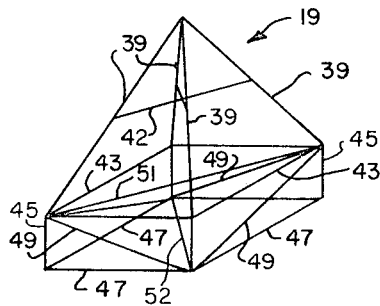
FIGURE 4 is a schematic perspective view indicating the framing arrangement of the docking element shown in FIGURE 3.

As shown in FIGURES 3 and 4, the projecting docking element 19 is an open frame structure comprising a pyramid portion 35 and a prismatic portion 37. The pyramid portion 35 includes four primary frame members 39, one at each corner thereof, with these members converging at an apex where they are joined as by welding to plate 41. As will be explained hereafter, at least one of the members 39 is releasably connected to the plate 41 for purposes to be set forth.

Each of the frame members 39 is braced by perpendicularly related braces 42 connected to and extending between diametrically opposed members 39. At the junction between the pyramid portion 35 and the prismatic portion 37 intermediate braces 43 span all four sides of the pyramid base. The prismatic portion 37 is formed by four parallel primary frame members 45 matching end to end with the members 39 and being braced at their other ends by braces 47 about all four sides of the prismatic portion 37. The prismatic portion 37 is further braced by diagonal braces 49 extending between upper and lower corners of the prismatic portion, and diagonal braces 51 and 52 extending between two corners of the prismatic portion at opposite ends thereof. All of the frame members, with the exception of the end braces 47, comprise two angle members joined together to form a T-shaped cross section and the end braces 47 are single angle members, it being obvious that other shaped frame members may be employed.

At one corner of the prismatic portion 37 a latch 53 is pivotally mounted at 55 to the stem of the T-shaped member 45. The latch 53 is of a bell crank configuration including a handle 57 connected to a spring 59 also connected through an aperture (not shown) in the end brace 52 to bias the latch 53 in the latching position. A slot 63 is provided in the flange of the frame member 45 to permit the latch to swing between latching and unlatching positions. As the docking operation occurs the members 27 and 25 that form the circular opening 21 will engage the corners of the prismatic portion 37 as the projecting element 19 moves into the opening 21 and the latch 53 will be pressed inwardly by the sidewall of opening 21 and after the latch has passed the sidewall of opening 21 it will be returned to its latching position under force of spring 59. A surface 65 is formed on the frame member 27 to fit against an edge surface 67 of the latch 53.

To facilitate the transfer of crew members or supplies through the docking structure, one or more of the primary frame members 39 of the pyramid portion 35 may be adapted for being disconnected at the apex of the pyramid portion and pivoted outwardly to open up a better passageway between the docked vehicles. In FIGURE 3 one of the frame members 39 has its web portion notched at one end at 69 and the connection plate 41 is recessed at 71 to receive an overlapping portion 73 of the member 39 and a manually operated quick-disconnect latch 75 has a bolt portion that extends through the recessed portion 71 of the plate 41 and into a slot 76 in the portion 73. The latch 75 has a bayonet type catch on its end that rotates 90 degrees or more in the slot 76 to release the member 39 from the plate 41. The end of the member 39 opposite the latch 75 has its flanges notched at 77 so that the end portion of member 39 fits between a pair of projecting plates 79 welded on each side of the corresponding frame member 45. The web portion at the end of the frame member 45 is angled slightly at 81 so that the member 39 may pivot outwardly around a pivot 83 extending through the plates 79 and the member 39.

The projecting docking elements 19 are mounted on the docking end of the vehicle 13 within a square frame 85 (see FIGURES 2 and 3). The frame structure 85 is well supported by struts 87 extending from the frame structure 85 to an annular frame member 89 of the space vehicle 13. At the corners of the frame 85 slots 91 are incorporated that receive mounting plates 93 welded to the respective corners at the end of the prismatic portion 37 of the docking element 19.

Since the projecting docking element 19 may be required to absorb substantial lateral impact loads that will occur at the first contact between the pyramid portion 35 and the sidewall of the circular opening 21, shock absorbing elements are built into the mounting between the docking element 19 and the vehicle 13. Thus, a yieldable material such as crushable honeycomb material 95 (FIGURE 3) is disposed in the slots 91. It is not intended that the crushable material 95 absorb the docking energy but only the lateral impact forces applied to the docking element 35 when making initial contact with the sidewall of the circular opening 21.

When docking occurs between the vehicles 11 and 13 the apex of the pyramid portion 35 of each docking element 19 enters the corresponding circular opening 21, and one or more of the primary frame members 39 of each docking element initially contacts the sidewalls of the respective openings 21. Subsequently, the docking elements 19 are guided into and centered within the openings 21 while the sidewalls of the openings move over the pyramid portion 35 and ultimately engage all four corners of the prismatic portions 37 the sides of which are substantially equal to a chord of the circles defined by the openings 21 (see FIGURE 5). The latch 53 on each docking element locks the docking elements 19 within the openings 21 in the manner previously described.

The docking energy is absorbed by a plurality of pads 97 (FIGURE 5) of crushable material, for example, crushable metallic honeycomb, attached to and radially spaced around the annular frame member 25 of the space vehicle 11. The height of the prismatic portion 37 of the projecting docking element 19 should be greater than the thickness of the pads 97 so that absorption of the docking energy will begin only after the sidewalls of the circular openings 21 have encircled the prismatic portion of the projecting docking elements 19.

When it is desired to separate the vehicles 11 and 13 such separation may be accomplished by one of the existing methods, such as the shaped charged method, along a separation plane 99 which would leave the terminal outer shell or skirt of the vehicle 13, including the docking structure of vehicle 13, attached to the vehicle 11 thus relieving the vehicle 13 of this weight and giving it this advantage in completing its mission after leaving the spacecraft 11. It is evident that the vehicles may also be separated along their original meeting line leaving both vehicles intact with the latches 53 being withdrawn by any means desired.

From the foregoing it can be seen that the invention provides a simple and very light weight docking structure while affording a reliable means of bringing the spacecraft into proper docking alignment and of adequately absorbing the docking energy. The heavy and bulky structure of previous docking devices has been largely eliminated and no reliability has been sacrificed.

Obviously, many modifications and variations of the present invention are possible in the light of the above teachings.

We claim:
1. A spacecraft having a docking structure at the docking end thereof, said docking structure comprising:
   (a) a docking element projecting from said docking end of said spacecraft;
   (b) said docking element comprising a pyramid portion and a prismatic portion;
   (c) the projecting end of said docking element constituting the apex of said pyramid portion;
   (d) the other end of said docking element constituting one end of said prismatic portion;
   (e) said other end being anchored to said docking end of said spacecraft;
   (f) said pyramid portion and said prismatic portion being joined between said ends of said docking element.

2. The invention as defined in claim 1 wherein said docking element comprises an open frame structure having a primary frame member extending longitudinally of the docking element at each corner of said pyramid portion and said prismatic portion.

3. The invention as defined in claim 1 wherein said pyramid portion is longer than said prismatic portion.

4. The invention as defined in claim 1 wherein said docking element includes quick-disconnect means for permitting displacement of the structure of said docking element to facilitate a passageway through said docking element.

5. The invention as defined in claim 1 wherein said pyramid portion has four faces and said prismatic portion has four sides, said faces corresponding to said sides at the junction between said pyramid portion and said prismatic portion.

6. Docking structure for in flight docking of a pair of spacecraft comprising:
   (a) a docking element projecting from the docking end of one of said spacecraft;
   (b) said docking element comprising a pyramid portion and a prismatic portion;
   (c) the projecting end of said docking element constituting the apex of said pyramid portion;
   (d) the other end of said docking element constituting one end of said prismatic portion;
   (e) said other end being anchored to said docking end of said one spacecraft;
   (f) the docking end of the other of said pair of spacecraft having an opening therein adapted to receive said docking element of said one spacecraft;
   (g) said opening having a circular entrance adapted to guide said docking element into said opening;
   (h) the sides of said prismatic portion being substantially equal in width to a chord of the circle defined by said circular entrance whereby the corners of said prismatic portion when entering said entrance will bear on the sidewall of said entrance and stabilize said projecting element.

7. The invention as defined in claim 6 wherein said circular entrance comprises a circular frame having a cross section less in thickness and width than the length of said prismatic portion.

8. The invention as defined in claim 6 wherein said docking structure on one of said pair of spacecraft incorporates means for latching said docking element within said opening.

9. The invention as defined in claim 6 including energy absorbing means carried by the docking end of one of said pair of spacecraft.

10. The invention as defined in claim 6 wherein said anchoring between said other end of said docking element and said docking end of said one spacecraft includes yieldable shock absorbing means for absorbing lateral impact loads that occur at the first contact between the pyramid portion of said docking element and said sidewall of said circular opening.

References Cited

UNITED STATES PATENTS

| | | | |
|---|---|---|---|
| 3,201,065 | 8/1965 | Dunn | 244—1 |
| 3,254,863 | 6/1966 | Tyler | 244—1 |
| 3,391,881 | 7/1968 | Maltby | 244—1 |

FERGUS S. MIDDLETON, *Primary Examiner.*